United States Patent
Dunne et al.

(10) Patent No.: US 7,166,149 B2
(45) Date of Patent: Jan. 23, 2007

(54) ADSORPTION PROCESS FOR CONTINUOUS PURIFICATION OF HIGH VALUE GAS FEEDS

(75) Inventors: Stephen R. Dunne, Algonquin, IL (US); Peter K. Coughlin, Mundelein, IL (US); Rustam H. Sethna, Palatine, IL (US)

(73) Assignee: UOP LLC, Des Plaines, IL (US)

( * ) Notice: Subject to any disclaimer, the term of this patent is extended or adjusted under 35 U.S.C. 154(b) by 329 days.

(21) Appl. No.: 10/755,453

(22) Filed: Jan. 12, 2004

(65) Prior Publication Data

US 2005/0150378 A1  Jul. 14, 2005

(51) Int. Cl.
 *B01D 53/06* (2006.01)
(52) U.S. Cl. .............. 95/113; 95/117; 95/118; 95/119; 95/120; 95/121; 96/123; 96/125; 96/128; 96/130; 96/131; 96/143; 96/144
(58) Field of Classification Search .......... 95/113, 95/115, 117, 118, 119, 120, 121, 124; 96/123, 96/125, 128, 130, 131, 143, 144; 62/271
See application file for complete search history.

(56) References Cited

U.S. PATENT DOCUMENTS

| | | | |
|---|---|---|---|
| 2,700,537 A | 1/1955 | Pennington | 261/83 |
| 2,739,670 A | 3/1956 | Miller | 183/114.2 |
| 2,926,502 A | 3/1960 | Munters et al. | 62/94 |
| 2,993,563 A | 7/1961 | Munters et al. | 183/4.6 |
| 4,012,206 A | 3/1977 | Macriss et al. | 55/34 |
| 4,134,743 A | 1/1979 | Macriss et al. | 55/34 |
| 4,324,564 A | 4/1982 | Oliker | 55/20 |
| 4,589,892 A | 5/1986 | Leonard | 55/162 |
| 4,701,189 A | 10/1987 | Oliker | 55/34 |
| 4,775,484 A | 10/1988 | Schmidt et al. | 210/673 |
| 4,926,618 A | 5/1990 | Ratliff | 55/20 |
| 5,167,679 A * | 12/1992 | Maekawa et al. | 96/125 |
| 5,512,083 A * | 4/1996 | Dunne | 95/113 |
| 5,580,369 A | 12/1996 | Belding et al. | 96/125 |
| 5,642,629 A * | 7/1997 | Ohman | 62/401 |
| 5,683,532 A | 11/1997 | Kuma | 156/184 |
| 5,685,897 A | 11/1997 | Belding et al. | 96/154 |
| 5,758,508 A | 6/1998 | Belding et al. | 62/94 |
| 5,788,744 A | 8/1998 | Klobucar et al. | 95/113 |
| 5,890,372 A | 4/1999 | Belding et al. | 62/271 |
| 5,891,219 A | 4/1999 | Klobucar et al. | 95/113 |
| 6,003,327 A | 12/1999 | Belding et al. | 62/271 |
| 6,004,384 A | 12/1999 | Caudle | 96/125 |
| 6,018,953 A | 2/2000 | Belding et al. | 62/94 |
| 6,050,100 A | 4/2000 | Belding et al. | 62/271 |

(Continued)

FOREIGN PATENT DOCUMENTS

GB   2178976 A   2/1987

*Primary Examiner*—Robert A. Hopkins
(74) *Attorney, Agent, or Firm*—John G. Tolomei; Mark Goldberg

(57) ABSTRACT

Using a high pressure rotary adsorbent wheel, a high value compressed gas feed can be purified by concentrating the impurity such as water, condensing it out, before final purification. Instead of exhausting gas from the system, the effluent can be put back into the feed at a point prior to condensation of the high value gas feed, and therefore the entire feed is purified without any high value gas feed going into a waste stream.

24 Claims, 6 Drawing Sheets

U.S. PATENT DOCUMENTS

| | | |
|---|---|---|
| 6,080,227 A | 6/2000 | Kurosawa et al. ............. 96/111 |
| 6,183,539 B1 | 2/2001 | Rode et al. .................... 95/117 |
| 6,199,388 B1 | 3/2001 | Fischer, Jr. .................... 62/90 |
| 6,231,644 B1 | 5/2001 | Jain et al. ...................... 95/96 |
| 6,294,000 B1 | 9/2001 | Klobucar ..................... 95/113 |
| 6,328,787 B1 | 12/2001 | Yamauchi .................... 95/113 |
| 6,355,091 B1 | 3/2002 | Felber et al. .................. 95/10 |
| 6,361,585 B1 | 3/2002 | Anzai et al. ................... 95/113 |
| 6,364,943 B1 | 4/2002 | Maekawa .................... 96/123 |
| 6,406,522 B1 | 6/2002 | McFadden et al. ........... 95/113 |
| 6,406,523 B1 | 6/2002 | Connor et al. ................ 96/125 |
| 6,447,583 B1 | 9/2002 | Thelen et al. ................. 96/125 |
| 6,478,855 B1 | 11/2002 | Okano ......................... 95/113 |
| 6,488,747 B1 | 12/2002 | Keefer et al. ................. 96/125 |
| 6,500,236 B2 | 12/2002 | Suzuki et al. ................. 95/113 |
| 6,514,319 B2 | 2/2003 | Keefer et al. ................. 95/101 |
| 6,517,610 B1 | 2/2003 | de la Houssaye ........... 95/107 |
| 6,521,019 B2 | 2/2003 | Jain et al. ...................... 95/96 |
| 6,521,026 B1 | 2/2003 | Goto ........................... 96/122 |
| 6,526,674 B1 | 3/2003 | Fielding et al. ................ 34/80 |
| 6,527,836 B1 | 3/2003 | White, Jr. et al. ............ 96/113 |
| 6,527,837 B2 | 3/2003 | Kurosawa et al. ........... 96/125 |
| 6,530,975 B2 | 3/2003 | Rode et al. ................... 95/117 |
| 6,533,846 B1 | 3/2003 | Keefer et al. ................. 96/125 |
| 6,565,635 B2 | 5/2003 | Keefer et al. ................. 96/125 |
| 2003/0163929 A1 | 9/2003 | Vertriest ....................... 34/80 |

* cited by examiner

ADSORPTION PROCESS FOR CONTINUOUS PURIFICATION OF HIGH VALUE GAS FEEDS

FIELD OF THE INVENTION

The present invention relates to processes and equipment for gas purification, and more particularly to a gas purification method and apparatus using continuous rotary contactors also known as adsorbent wheels. More particularly, this invention relates to the use of continuous rotary contactors to remove impurities from a gas feed stream after compression of the gas feed stream. In the preferred embodiments of the invention, the invention provides for removal of impurities with minimal drop in pressure of the gas stream feed resulting from use of the continuous rotary contactors.

Process streams often need to have condensable impurities, such as water, removed. The streams themselves are valuable either due to chemical value, or due to the value of the energy expended in doing work to them, such as compression. The impurity can often be removed by adsorption. Due to cost and convenience, the system needs to be designed so that the adsorbent is regenerated and reused. Often a less valuable stream is used for regeneration. For example, in natural gas regeneration, nitrogen is used as the regeneration stream. However, there is still a significant cost involved in providing this regeneration stream.

One important use of compressed, treated gas is in dry air is for use by equipment or machinery. The current practice is to first compress the air and then use adsorbent beds to remove water and other contaminant vapors and gases. In this practice, a dryer containing the appropriate adsorbent is placed downstream from an air compressor and a portion of the compressed air is used as a regeneration medium for the dryer. In thermal swing adsorption (TSA) drying, a portion of the product gas is heated and is then used as a regeneration medium. Similarly, in pressure swing adsorption (PSA) units, a portion of the product gas together with the adsorbent bed is opened to a lower pressure and the expanded gas carries away the contaminants. In both types of systems, the energy used in compressing a portion of the gas has been lost when that portion of gas is used for regeneration instead of remaining with the bulk of the compressed air for use in equipment or machinery. There would be considerable energy savings in a system that retained the high pressure gas.

Rotary adsorbent contactors have been developed for several applications including heating and air conditioning as well as VOC concentration, prior to their destruction. These rotary contactors, also referred to as adsorbent wheels, have been used in dehumidification or desiccant wheels, enthalpy control wheels and open cycle desiccant cooling systems. However, prior to the present invention, it had not been recognized that an adsorbent wheel system had the capability to be used in a variety of other applications. In particular, there has been no recognition that rotary contactors could be employed in high pressure systems to purify gas streams to high levels of purity.

Most applications of desiccant wheel technology, particularly in the heating and air conditioning field have focused on bulk drying of air where the humidity of the incoming air is reduced from near saturation by a factor of about 2. A relative humidity of about 80% at ambient temperature would be reduced in such a way that the water content is cut by a factor of 2 to 3. The result in such bulk drying applications is that there is an inevitable gain in sensible heat associated with passing air through an essentially adiabatic drying operation and the temperature rise further lowers the relative humidity of the product stream. However, desiccant wheels have not previously to the present invention been used in applications requiring very dry, pure air, such as air prepurification and instrument air drying. The present invention can provide a decrease in water and other impurities that is several orders of magnitude greater than the prior art uses of such desiccant wheels. The level of water can be decreased from levels in the thousands of parts per million to the single digit levels, depending upon the particular configuration and the particular need for purity. The present invention has application not only in air drying, but in other applications where there is a compressed gas to be dried or otherwise purified. These gases include natural gas and other hydrocarbon applications.

In the present invention, a gas is dried and otherwise treated at high pressure with rotary adsorbent contactors after it exits a compressor. This process conserves the energy used in the compression step to a much greater degree than when adsorbent beds are employed. This produces air at dew points which meet or exceed the capabilities of current compressed air drying equipment and at lower cost.

Environmental benefits are also realized in elimination of refrigerated type compressed air dryers that use chlorofluorocarbon refrigerants which are damaging to the earth's ozone layer.

SUMMARY OF THE INVENTION

The present invention comprises at least one rotary adsorbent contactor to purify a high pressure gas stream (above 15 psia). The number of rotary adsorbent contactors is dependent upon the particular application which determines the purity of gas that is necessary. At least one rotary adsorbent contactor is used with additional rotary adsorbent contactors added in certain applications, such as in the removal of additional impurities or when very low impurity levels are desired.

In one embodiment, the present invention comprises a process of producing purified compressed gases comprising the steps of first sending a gas feed to a gas compressor to produce a heated, compressed gas. Then a heated compressed gas is sent through a regeneration sector of a rotary adsorber to remove impurities from the regeneration sector of the rotary adsorber to produce a stream of compressed gas containing these impurities. Next, the contaminated stream of compressed gas is cooled in a condenser where a portion of contaminants is condensed from the contaminated stream of compressed gas. This portion of contaminants is removed from the process at this point and the resulting stream is a cooled stream of compressed gas. This cooled stream of compressed gas is passed to an adsorption sector of said rotary adsorber wherein a further quantity of contaminants is removed from said compressed gas to produce a purified compressed gas product. Then the purified compressed gas product is brought to a desired temperature, and then a minor portion of cooled compressed purified gas is removed from the purified compressed gas product to be sent to a cooling sector of said rotary adsorber to cool said cooling sector.

In another embodiment of the present invention, the heated compressed gas can be further heated by some external means such as heat exchange with some hotter gas or fluid, prior to being sent through the regeneration sector of the rotary adsorber.

In another embodiment of the present invention, the gas feed is compressed by some natural means, such as in a natural gas well. This gas, if not naturally sufficiently hot for regeneration, is heated prior to being sent through the regeneration sector of the rotary adsorber.

In another embodiment of the present invention is provided a process of producing dry compressed air comprising the steps of first sending a stream of air to at least one air compressor to produce a stream of heated, compressed air. Then a stream of heated compressed air is sent through a regeneration sector of a rotary adsorber to remove water from the regeneration sector thereby producing a cooled wet stream of compressed air. Then the cooled wet stream of compressed gas is sent through a heat exchanger to produce a cooler stream of compressed gas and to condense and remove a portion of water from the cooled wet stream. After the portion of water is removed, the cooler stream of compressed air is passed to an adsorption sector of said rotary adsorber wherein a further quantity of water is removed from the cooler stream of compressed air to produce a dried compressed air product stream and wherein the adsorption sector adsorbs water from the cooler stream of compressed air. The purified compressed gas product is sent through a second heat exchanger to cool the purified compressed gas product to a desired temperature and a minor portion of cooled purified compressed gas is removed from the cooled purified compressed gas product to be sent to a cooling sector of the rotary adsorber to cool the cooling sector.

In another embodiment of the invention, a two-stage purifier is used for producing a low impurity gas stream. At least two rotary contactors are used, each rotary contactor having a multiplicity of passages, through which compressed gas can flow, for adsorbing impurities therefrom. The rotary contactors are capable of adsorption of impurities from said compressed gases and of regeneration on a continuous basis as the wheel rotates. Each rotary contactor (also referred to as an adsorbent wheel) comprises at least one adsorbent, regeneration and cooling sector. There are connecting means to provide a compressed flow of moisture containing gas to the regeneration sector of a first of the two rotary contactors and connecting means to send the compressed flow of a moisture containing gas from the regeneration sector to a condensing means wherein condensed impurities are removed to produce a dried flow of gas. There are connecting means to send said purified flow of gas through an adsorption zone of said first rotary contactor; connecting means to send said purified flow of gas from said adsorption zone of said first rotary contactor through an adsorption zone of said second rotary contactor to produce a very pure gas product stream; and connecting means to send a majority portion of said very pure gas stream to be used as product. Means to send two minority portions of said very pure gas stream, a first of said minority portions to be first heated to a desired temperature and then to be sent to a regeneration zone of said second rotary contactor and a second of said minority portions to be cooled to a desired temperature and then to be sent to a cooling zone of said rotary contactor. These two streams can be further compressed, if needed to compensate for any pressure drop, and reintroduced back into the main stream of the compressed gas at points which will allow the impurity to be removed in the condensation step, i.e. prior to initial feed compression, prior to introduction to the regeneration sector of the first rotary adsorber, prior to sending to the condensation means, or prior to sending to the adsorption zone of said first rotary contactor.

In another embodiment of the present invention, the adsorbent wheels can contain multiple adsorbent, regeneration and cooling zones as represented by the following set of factors. This invention is a process of producing purified compressed gases comprising rotating a sector of a rotary adsorber through N adsorption zones designated from 1 to N, wherein N is an integer from 2 to 10, then rotating said sector of said rotary adsorber through M regeneration zones designated from 1 to M, wherein M is an integer from 2 to 10, and then rotating said sector of said rotary adsorber through P cooling zones, wherein P is an integer from 0 to 5 and wherein when P is greater than 0, said adsorber zone rotates from cooling zone 1 to P and then back to adsorber zone 1 to establish a continuous adsorption, regeneration, and cooling cycle. Then a compressed gas feed stream is sent through regeneration zone M to remove at least one impurity from said regeneration zone, and producing an effluent enhanced in the impurity. Next are M-1 steps sending the effluent from regeneration zone H, where H is an integer and decrements from M to 2 with each step, into regeneration zone H-1 to remove at least one impurity from said regeneration zone, and producing an effluent enhanced in the impurity. Then cooling the effluent stream from regeneration zone 1, condensing a portion of the impurities, and removing the impurities thereby producing a cooled stream of compressed gas. In the next step, the cooled stream of compressed gas is sent through adsorption zone N of the rotary adsorbent to adsorb at least one impurity on the adsorber and produce an effluent stream depleted in at least one impurity. There follow N-1 step(s) sending the effluent stream from adsorption zone K, where K is an integer and decrements from N to 2 with each step, into adsorption zone K-1 to adsorb at least one impurity on the adsorber and produce an effluent stream depleted in at least one impurity, the effluent from step N-1 being a purified product stream. If P is greater than 0, at least a portion of the purified product stream is cooled and sent through cooling zone P, to cool the adsorber and produce an effluent stream with greater enthalpy of if P is zero, and wherein if P is 0, skipping this cooling step and if P is greater than 1, P-1 steps sending the effluent from cooling zone L, where L is an integer to cool the adsorber and producing an effluent stream with greater enthalpy and if P is 1, skipping this step.

DETAILED DESCRIPTION OF THE INVENTION

Rotary adsorbers (adsorbent wheels) are very efficient ways to reduce the amount of adsorbent needed to remove a given amount of impurity from a stream in a temperature swing adsorption (TSA) process. The reason for this is that a wheel does not require a significant equilibrium zone as does a fixed bed adsorber. A substantial equilibrium zone is beneficial in fixed bed adsorbers because the valves, adsorbent vessel walls, heads, and adsorbents, all need to be heated and cooled during the full adsorption/regeneration cycle. Without a significant equilibrium zone, a much greater portion of the energy expenditure is going to heat the ancillary components compared to the adsorbent. In the case of a rotating wheel, only the bed and a small thermal mass associated with wheel support structure is heated. The wheel housing surrounding the regeneration sector stays at a relatively constant high temperature and does not undergo any temperature cycling.

Also in the wheel system, the mass transfer is significantly higher than for fixed bed adsorbers. This is because the wheel generally uses thin layers of adsorbent material that give a substantially shorter path length from the gas phase feed to the average adsorption site. Fixed bed adsorbers must employ relatively large formed adsorbent particles so as to reduce pressure drop. The pressure drop experienced by gas in a monolithic wheel structure is extremely low for wheels due to the high void fraction of the monolith and the resulting large equivalent hydraulic diameter for flow.

Figure 1:
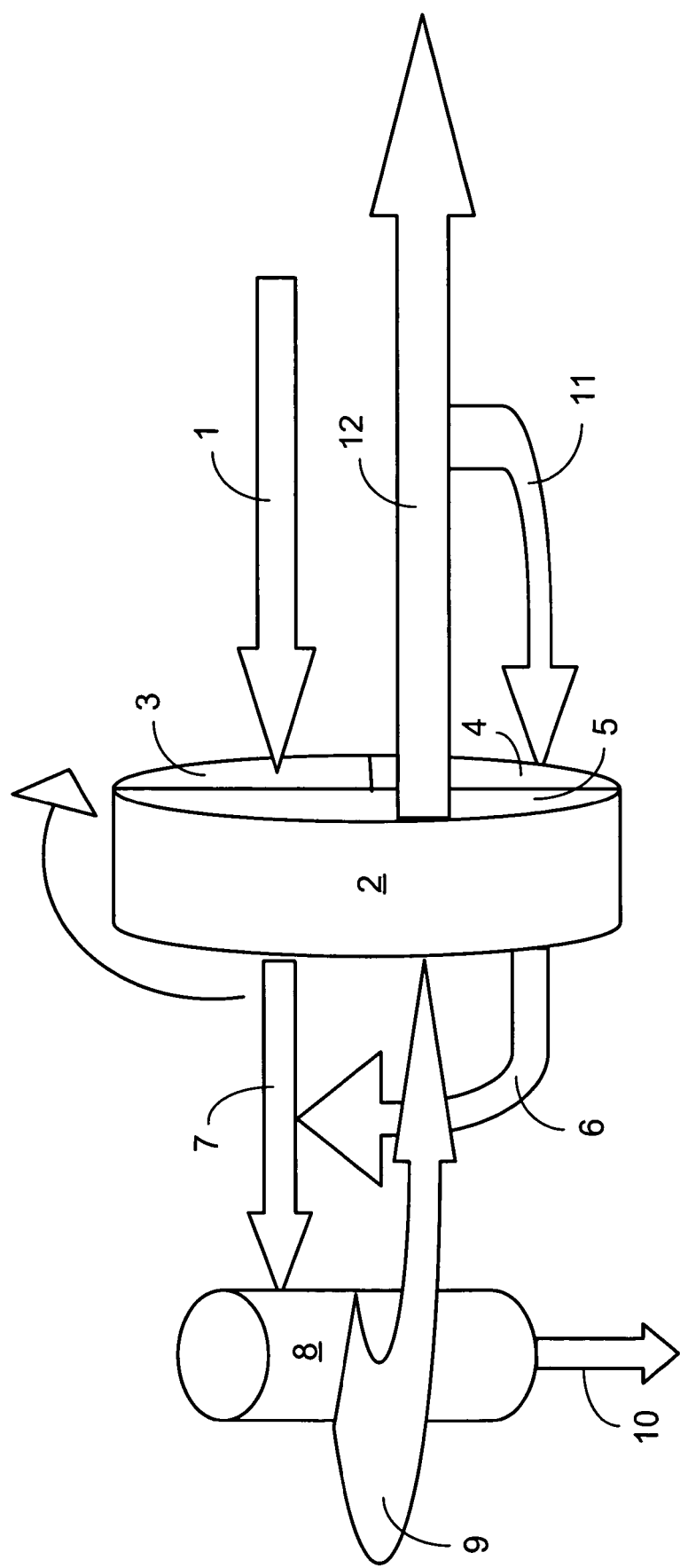
FIG. 1 shows a simplified depiction of the process of the present invention.
Figure 2:
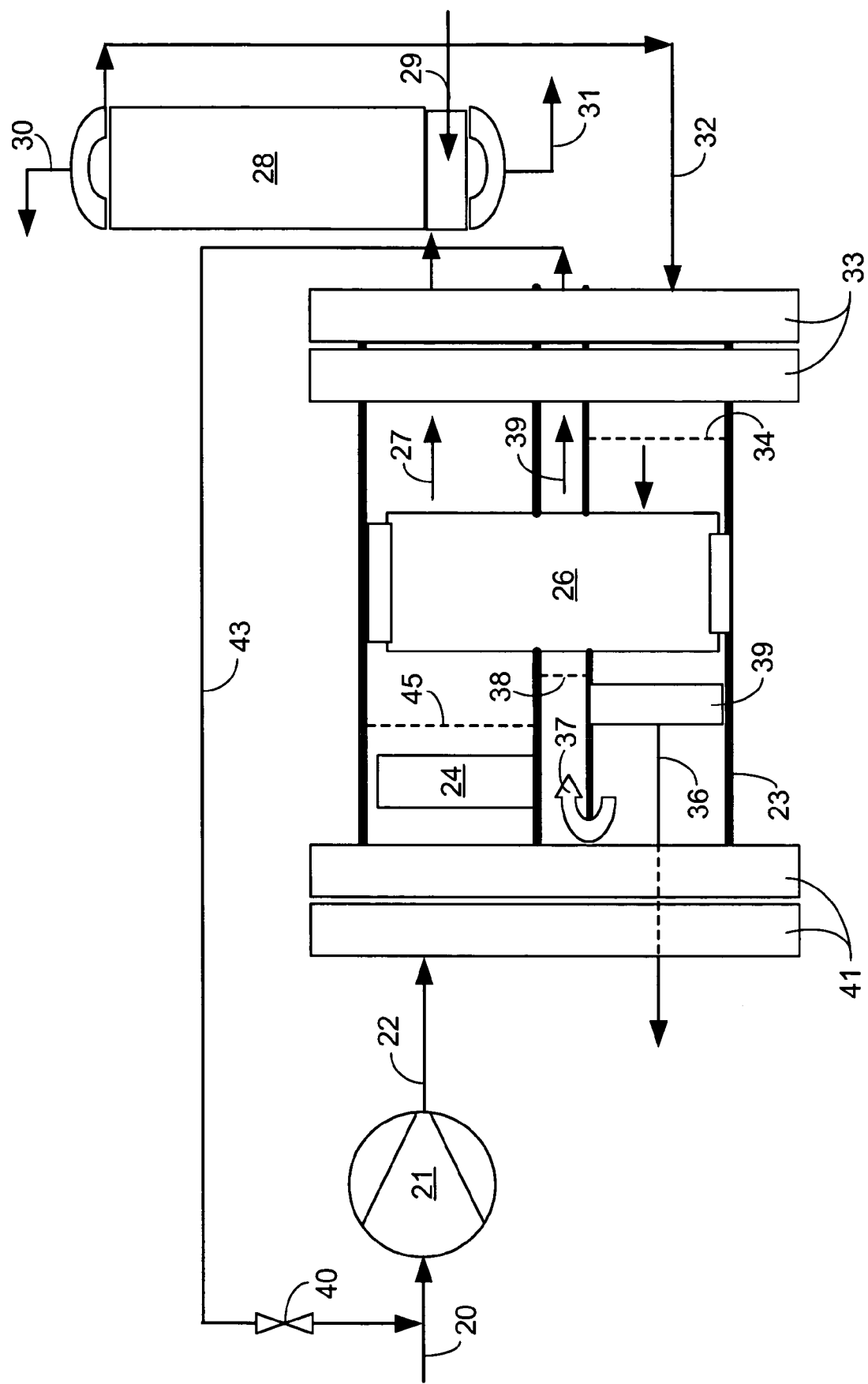
FIG. 2 shows a high pressure desiccant wheel air dryer system.

An example of the wheel system is in the removal of water from a stream of air. As can be seen in FIGS. 1 and 2, hot compressed feed goes directly into the regeneration zone of the wheel. Under most circumstances this stream will leave the regeneration zone in a state close to saturation. The degree of saturation will depend upon the humidity of the stream, the regeneration energy supply, and the relative size of the regeneration zone. This near saturated stream is then cooled, and the water is removed from the system by condensation. This cooled water-containing stream passes to the adsorption zone of the wheel in a direction that is counter-current to the direction of the regeneration flow. This dried product stream is split, with some of it going back into the cooling zone of the wheel, counter-current to the direction of adsorption. The cooling effluent steam, also close to saturation with water, is combined with the regeneration effluent stream prior to cooling and condensation.

In this process, the wheel rotates so that a given sector of the wheel functions first as the adsorption zone and then is rotated to be exposed to a regeneration flow and then to a cooling flow of gas, and then back to the adsorption zone again to start the cycle again. In general, the adsorption zone will comprise about one-half of the surface of the wheel, with the regeneration and cooling zones comprises about one-quarter of the wheel surface each. These fractions may vary depending upon the application of the wheel and the particular load placed on the wheel.

This process is a significant improvement over the processes currently in use in heat of compression dryers. Those dryers use fixed beds of adsorbent. A hot compressed feed is fed to regenerate the fixed bed. The resulting stream that is now saturated with water vapor is then cooled to condense and remove much of the water. This cooled stream is then sent counter-currently to a hot regenerated bed for adsorption. The addition of a cooling step, in the present invention using an adsorbent wheel allows for less of the enthalpy of the system to leave in the product stream. Therefore the cooled stream will now be drier since it will be at equilibrium with the adsorbent bed at a lower temperature. In the prior art, fixed bed non-wheel case such a process configuration would require a third adsorbent bed, or a substantial increase in valving and cycle complexity to achieve a cooled bed. Such changes are costly. In the adsorbent wheel, this only requires dividing the wheel into the three zones—regeneration, cooling and adsorption.

For this process to effectively operate to remove impurities from a high pressure flow of gas, the stream going to the adsorption zone needs to be compressed prior to contacting the adsorbent wheel, so that the pressure of the inlet to the cooling zone is greater than the pressure of the inlet to the regeneration zone.

In some applications a condenser will be placed prior to compression of the gas. Whether this compression is done prior to or after the condenser on the regeneration or cooling effluent may be a matter for the specifics of the process streams. Compression prior to condensation requires compression to higher pressure, and requires compression of the water in the regeneration/cooling effluent, but allows for a cooler gas going into the adsorption zone. This will allow for a lower dew point product. Compression after condensation compresses less gas, and requires lower pressure, but brings a higher temperature feed to the adsorption zone. Additional cooling after compression could be more economical in certain high purity applications. A small portion of the product should be compressed to pressurize the rim and hub of the wheel to a pressure above the pressure of the feed to the adsorption sector to prevent feed from entering the rim or hub, and winding up in the product.

There are several different types of rotary contactors that may be used in the present invention. One type of rotary contactor or wheel has a central hub and a casing. Between hub and casing is provided a media capable of regeneration or paperboard material having desiccant dispersed therein for removing moisture from the process air stream.

Often rotary adsorbers are used in non demanding applications like HVAC enthalpy recapture where leakage from one stream to another is not critical to the performance. In these high pressure applications the possibility of leakage is greater because of the high pressure and the effect of the leakage can be great when the product needs to be of high purity compared to the feed.

Therefore, the seals around the rotary adsorber can be important for the functioning of the process, such as those known in the prior art. In U.S. Pat. No. 6,406,523, incorporated herein in its entirety, a rotary adsorber is disclosed which can be used to make adsorptive separations using pressure swing regeneration. Other rotary adsorbers can be used if the sealing of the rotating surfaces is adequate. There are many other types of seals known in the art, often providing multiple sealing surfaces to minimize the leakage at the moving faces.

In another embodiment of the invention, the media is fabricated by providing alternating layers of flat and corrugated paperboard that are positioned to provide a multiplicity of open-ended passages parallel to the axis of rotation to permit air to flow there through. Typically, the media is formed by winding a web of corrugated paperboard (having a flat sheet of paperboard bonded to one side) about the hub until a multi-layered media is built up that extends to the outer casing. The corrugated paperboard having one side flat is made by bonding or positioning a flat strip of paperboard over a corrugated strip of paperboard. The width of the strip determines the width of the wheel, and the edges of the paperboard forms the faces of the wheel. It should be understood other fabrication techniques that form passages may be used.

The media or paperboard for the wheel can be comprised of a fibrous material and any material that operates to remove moisture from an air stream such as process air on a continuous basis. The wheel is formed from a paperboard comprising thermally stable fibrillated synthetic organic or inorganic fibers and an adsorbent material selected for the particular application. In applications for the removal of water from a gas the adsorbent is either an X-type zeolite in conjunction with silica gel and/or pseudoboehmite alumina or a chemically modified Y-type zeolite. In the present invention, the adsorbent is anticipated to be a zeolite or mixture of such zeolites. In some applications, the adsorbent can comprise blends of alumina, silica gel and zeolite.

Fibrillated organic fibers, because of their strength and ability to interlock, provide suitable reinforcement at levels as low as 15% by weight of the total desiccant paperboard. A number of different organic and inorganic fiber materials may be used for the desiccant paper for the desiccant wheel, depending upon the temperatures at which the desiccant wheel is regenerated. For example, inorganic fibers such as fine-diameter fiberglass, mineral wool, or other ceramic materials, may be employed. Although such fibers are stable over a wide range of temperatures, they can suffer from cracking during the paper corrugation stage. Natural organic fibers such as cotton may also be used, although they are limited in regeneration temperature. Synthetic organic fibers useful in the invention are those comprising high-density polyethylenes, high-density polypropylenes, aromatic polyamides (i.e., aramids), polystyrenes, aliphatic polyamides, poly(vinyl chlorides), acrylics, acrylonitrile homopolymers, copolymers with halogenated monomers, styrene copolymers, and mixtures of polymers (e.g., polypropylene with low-density polyethylene, and high-density polyethylene with polystyrene).

However, due to its strength, light weight and temperature resistance, the preferred organic fiber for the desiccant wheel of the present invention is selected from aramids. The aramids are manufactured fiber in which the fiber-forming substance is a long-chain synthetic polyamide in which at least 85% of the amide (—CO—NH—) linkages are directly attached to the two aromatic rings. Such aramid fibers are available from DuPont under the trademark KEVLAR®. KEVLAR is commercially available as a refined pulp designed for paper forming, such as KEVLAR 303 pulp. During refining, the KEVLAR fiber shafts are split at the ends into fibrils by means of application of high shear, thereby creating a tree-like structure. In the manufacture of paperboard, it has been discovered that the fibrils interlock to enhance the paperboard strength. KEVLAR is stable in oxidizing atmospheres up to 450° C. Other high-temperature resistant aramids such as NOMEX®, available from DuPont, is suitable for formation of paperboard in the present invention. However, it is preferred that such fibers are refined or fibrillated in a similar manner.

In one process for manufacturing, the adsorbent wheels as used in the present invention, KEVLAR 303 pulp having fiber shafts that are approximately 12 mµ in diameter and up to 4 mm in length is first dispersed to form an aqueous slurry. The slurry is then fed to a disc or other high-shear refiner, which is effective in further splitting the fibrillated fiber shafts into additional fibrils. After the refining step, the KEVLAR 303 fiber shafts range from 1 mm to 4 mm in length with fibrils extending therefrom that are as small as 1 mµ to 3 mµ in diameter.

The adsorbent wheel can be manufactured using the above materials to provide a wheel or body which will readily adsorb moisture contained in ambient air and desorb the resulting moisture from the wheel during a regeneration cycle of short duration. In accordance with the present invention, a continuous rotary contactor (also known as an adsorbent wheel or desiccant wheel in some applications) is employed to dry and otherwise purify a compressed gas stream. A continuous system is thereby provided for the purification of a gas stream that has been compressed and is then employed for its intended application.

The adsorbent wheel may instead be made from a thin substrate (e.g., a 1.3 to 2-mil thick aluminum foil) coated on both sides with a particulate desiccant in a binder matrix (typical coating thickness of about 1 mil on each side). Adsorbent wheels can also be made from other metal foils, polymer films or paper substrates, coated or impregnated with solid adsorbents or deliquescent absorbents. Additionally, the speed at which the wheel is rotated and the mass of the wheel is preferably high relative to the mass of the gas flow being processed to increase the rate at which heat and mass can be transferred from one air stream to the other air stream.

In another embodiment, the adsorbent wheel is a rotary, desiccant coated, aluminum dehumidification wheel. The preferred desiccant-based drying wheel in applications where drying is important, utilizes a desiccant coating optimized to provide the maximum amount of dehumidification when operated under the operating conditions.

Because the dehumidification wheel is preferably used primarily for dehumidification and not for total energy recovery, it typically has relatively less substrate mass (30% to 50%) and relatively more desiccant mass (50% to 70%). A desiccant used for such a wheel desirably has as high a water adsorption capacity as possible and therefore as much useable desiccant mass on the wheel as is consistent with technical and economic constraints Furthermore, although non-desiccant mass is required to carry and support the desiccant material, the wheel preferably has as little non-desiccant mass as possible because such mass reduces the wheel's dehumidification efficiency.

Desiccant materials used for embodiments employing desiccant-based dehumidification wheels may include, for example, A-type, X-type or Y-type molecular sieves and other zeolites, activated alumina, lithium chloride and other deliquescent salts, hydrophobic polymers or other materials capable of adsorbing or absorbing water vapor from an air stream.

Another type of adsorbent wheel that can be used in the present invention includes those described in U.S. Pat. No. 5,683,532, incorporated herein in its entirety. In that patent is disclosed a method of manufacturing an active silica gel honeycomb adsorbing body which has a high efficiency of dehumidification or adsorption of other active gases and a relatively small passing resistance of gas in small channels. The conditions change depending upon the size of the small channels of the rotor, the size and the surface area of silica gel micropores and so on. An active silica gel honeycomb adsorbing body which has a high adsorbing rate for humidity, relatively little resistance to pass gases in the small channels and which can be used in an atmosphere having 100% relative humidity can be obtained by limiting a wave length of a single-faced corrugated sheet to approximately 2.5 to 6.5 mm, a wave height to approximately 1.3 to 4.0 mm, the quantity of active silica gel to approximately 0.5 to 3.0 times the weight of the inorganic fiber paper, a main distributing range of a micropore diameter of the produced silica gel to not more than approximately 200 angstroms and a specific surface area of the micropore to 300 to 600 $m^2/g$. The adsorbing body of the present invention can also adsorb and remove odorous materials other than moisture from an inert gas having a relative humidity of not more than 70%. The adsorbing body of the present invention is an adsorbing body obtained by synthesizing silica gel on a matrix of a honeycomb shape made of an inorganic fiber. The adsorbing body adsorbs moisture preferentially in the micropores of the silica gel and the adsorbing body adsorbs other odorous gases in the low relative humidity atmosphere. After the micropores of the adsorbing body are saturated with humidity and other active gases, the device cannot adsorb more adsorbate. Therefore, the adsorbing body can be operated in an atmosphere having 100% relative humidity.

The rotational speed of the adsorbent wheel may be adjusted according to the amount of purity and reheat efficiency sought.

DETAILED DESCRIPTION OF THE DRAWINGS

FIG. 1 displays a simplified representation of the basic process of the present invention. A stream of hot compressed gas in line 1 is shown contacting an adsorbent wheel 2 in a regeneration sector 3 of the adsorbent wheel 2. The arrow shows the direction of rotation of the adsorbent wheel 2. Depending upon the design of the system, an adsorbent wheel will rotate either clockwise or counterclockwise. A gas stream in line 7 that is now near saturation after passing through the adsorbent wheel 2 is as shown. The gas stream in line 7 is shown proceeding to a condenser 8 in which the gas stream in line 7 is cooled sufficiently to condense much of the moisture, that is seen leaving the system as condensed water in a line 10. A flow of cooled saturated gas stream in line 9 now proceeds from the condenser 8 to an adsorption sector 5 of the adsorbent wheel 2, where most of the remaining water, or other impurities, are removed from the gas stream in line 9. A major portion of a resulting dried gas flow in line 12 continues and constitutes the product gas. This product gas is at very low moisture levels and is at a temperature that is higher than the incoming gas due to the effect of the adsorption process. A minor portion of a resulting dried gas flow is shown at line 11 and is routed back to the adsorbent wheel 2 at a cooling sector 4. This minor portion normally will comprise about 2 to 6% of the resulting dried gas flow. The adsorbent wheel 2 is thereby cooled to a desired level prior to contacting the higher temperature gas flows in the adsorption and regeneration parts of the cycle. After cooling the cooling sector of the adsorbent wheel, this gas flow is returned as flow in line 6 to the gas flow prior to condensation, shown as the gas stream in line 7. It would be possible for this flow that conducts the cooling operation to be exhausted from the system, but it is greatly preferable to conserve the gas stream since it has been found that the present invention provides a minimal decrease in pressure as the gas flows through the adsorbent wheel system.

FIG. 2 shows a schematic of a high pressure air dryer in accordance with the present invention. A flow of compressed air in line 20 is shown going to a compressor 21 to be further compressed and heated as a result of the compression. Hot regeneration gas is shown as a gas stream in line 22 entering into a pressure vessel 23 through a tube (not shown) in a flange 41. The gas stream in line 22 is further heated by passing through a heat exchanger 24. The gas stream is directed through a distributing means, such as a distribution plate 45 and then passes through the regeneration sector of a desiccant wheel 26. A gas stream in line 27 proceeds to a condenser 28 to be cooled and water removed. In the condenser 28 shown, a flow of cooling water in line 29 enters the condenser 28 and exits at line 30. Condensate is shown exiting at line 31. A gas stream feed in line 32 is shown passing flanges 33 to a distribution plate 34 and then to the adsorption sector of the desiccant wheel 26 to further dry the gas stream. The dry air exiting the adsorption sector of the desiccant wheel 26 may be cooled further by a heat exchanger 39 and then this cooled, dry air is divided into a major portion that is the dry air net product in line 36 (shown exiting the pressure vessel 23) and a minor portion that is a cooling portion in line 37. The cooling portion in line 37 passes through a distribution plate 38 and then through a cooling sector of the desiccant wheel 26. The cooling portion, after passing through the cooling sector, is a gas stream in line 43 shown being recycled to the incoming stream in line 20 through a valve 40 to the compressor 21. In a typical application, the compressor 21 is the third stage compressor. The first and second stage compressors are not shown in the drawing.

Figure 3:
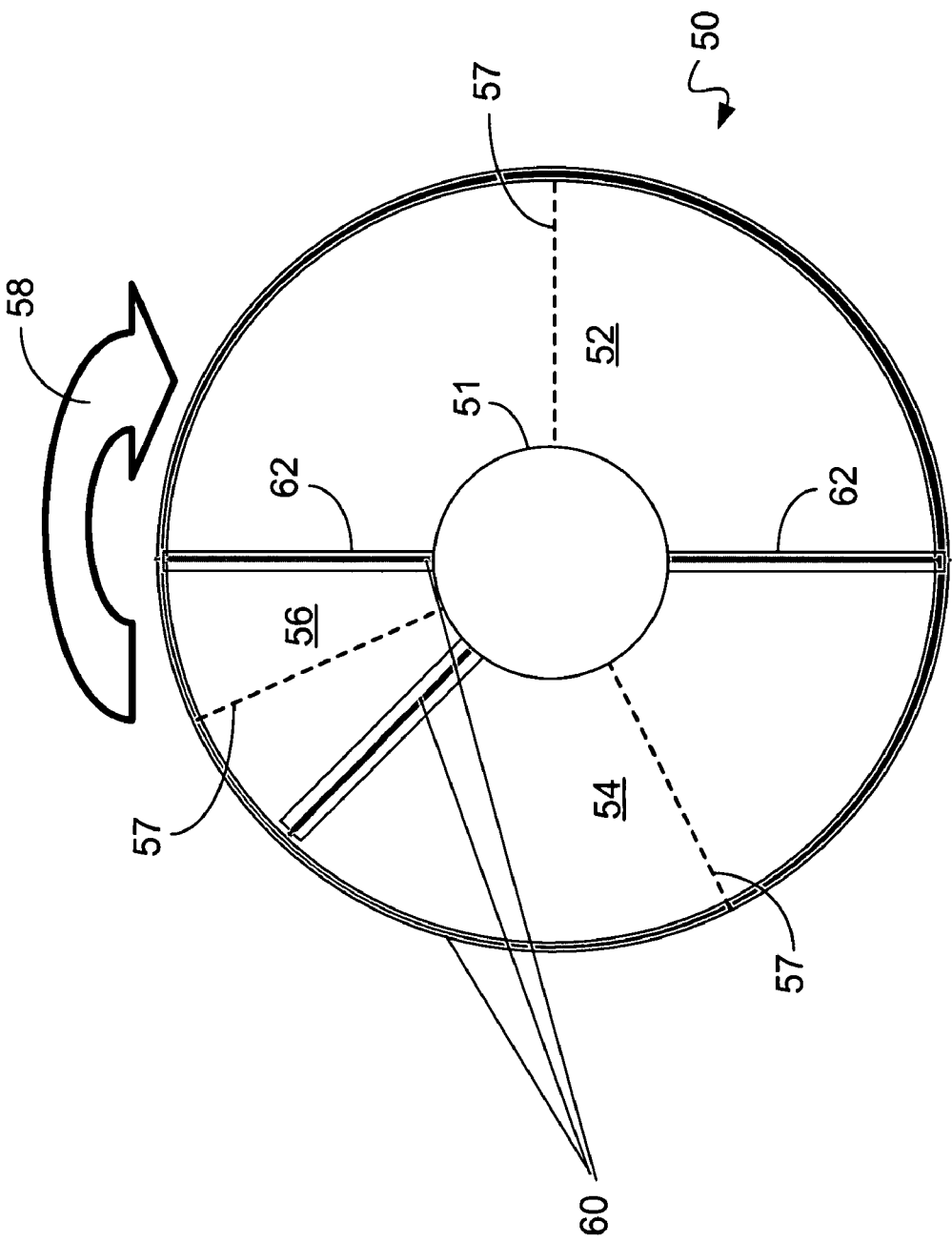
FIG. 3 shows an adsorbent wheel with its three principal sectors.

FIG. 3 is a face view of an adsorbent wheel 50 having a hub 51. The three sectors are displayed, with an adsorption sector 52, a regeneration sector 54 and a cooling sector 56. The gas flow is into the plane of the drawing in the adsorption sector 52 and out of the plane of the drawing in the cooling sector 56 and the regeneration sector 54. The wheel is shown as rotating in a clockwise direction as shown by arrow 58. Bulb seals 60 are shown dividing the sections of the adsorbent wheel 50 and welded strips for the seals 62. In a typical adsorbent wheel, the adsorption sector will comprise the largest section and the regeneration sector will be somewhat larger than the cooling sector. Dashed lines 57 show that the adsorption sector 52, the regeneration sector 54 and the cooling sector 56 may each be divided into two or more sectors in order to remove additional impurities from the gas flow.

Figure 4:
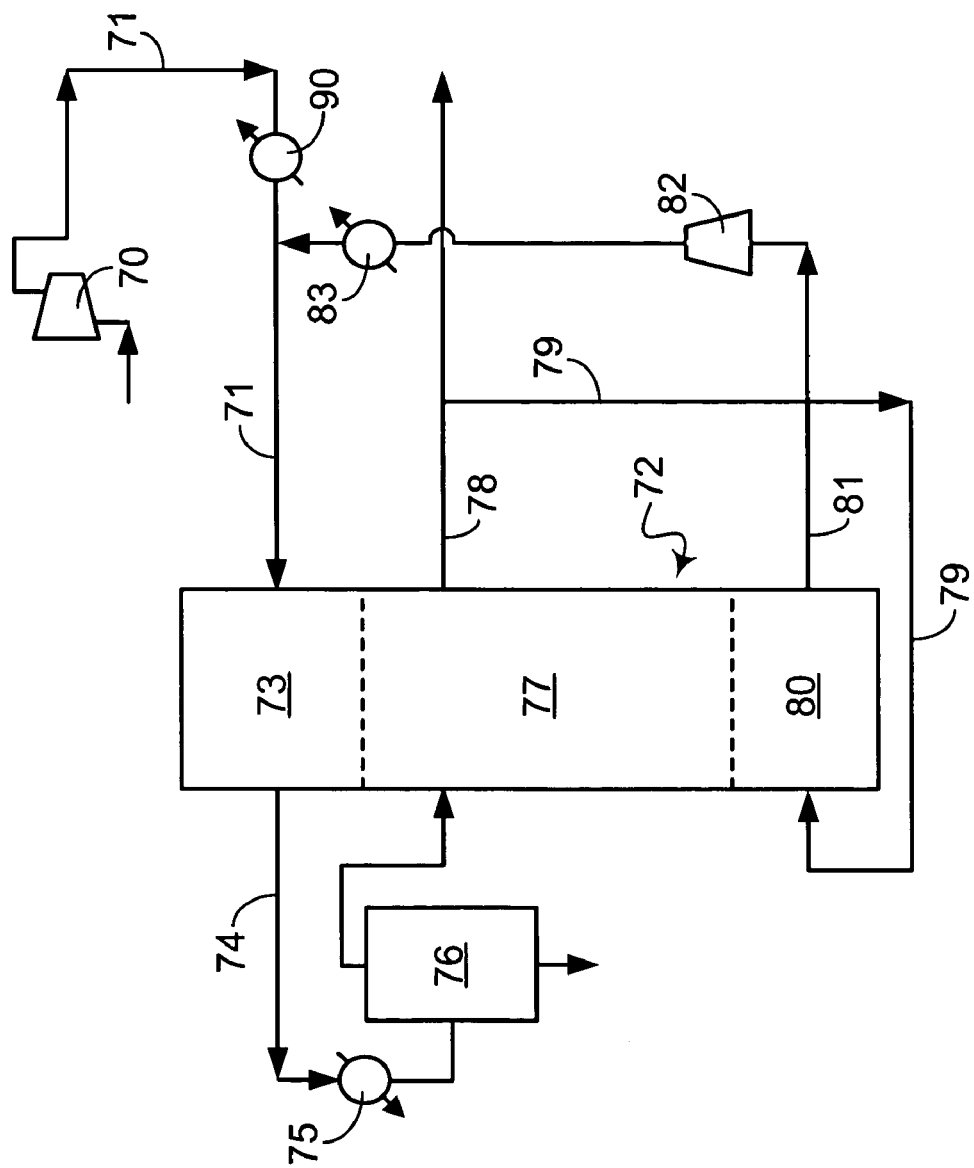
FIG. 4 shows a high pressure adsorbent wheel system with a co-current cooling step.

FIG. 4 shows an alternate embodiment of the invention with a co-current cooling step. A gas feed is compressed by a compressor 70 and continues as a gas stream in line 71. A compressor may not be necessary in applications where the gas feed is naturally compressed such as natural gas from some natural gas wells. The compressed gas feed in line 71 passes a heat exchanger 90 to heat the compressed gas feed in line 71 to a desired regeneration temperature and then to a regeneration sector 73 of an adsorbent wheel 72. The compressed gas removes impurities from the regeneration sector 73 and a now impurity-containing or contaminant-containing gas in line 74 continues to a heat exchanger 75 to cool the gas and then to a condenser 76 where the condensable impurities in the gas condense and are removed. The resulting cooled gas continues to an adsorption sector 77 of the adsorbent wheel 72 where most of the remaining impurities are adsorbed onto the adsorbent media of the adsorbent wheel producing a purified product gas in line 78. As shown in FIG. 4, a portion of the purified product gas in line 78 is diverted through a line 79 to a cooling sector 80 of the adsorbent wheel 72. The portion of the purified product gas in line 79 enters the cooling sector 80 of the adsorbent wheel 72 in a direction co-current to the direction of the gas flow to the adsorption sector 77. After cooling the adsorbent wheel 72, this portion of gas flow continues as a gas stream in line 81 through a boost blower 82 where the gas pressure is increased to match the pressure on the incoming gas stream in line 71. The temperature of the gas stream in line 81 is increased by a heat exchanger 83 and the gas stream in line 81 is combined with the regeneration gas stream in line 71.

Figure 5:
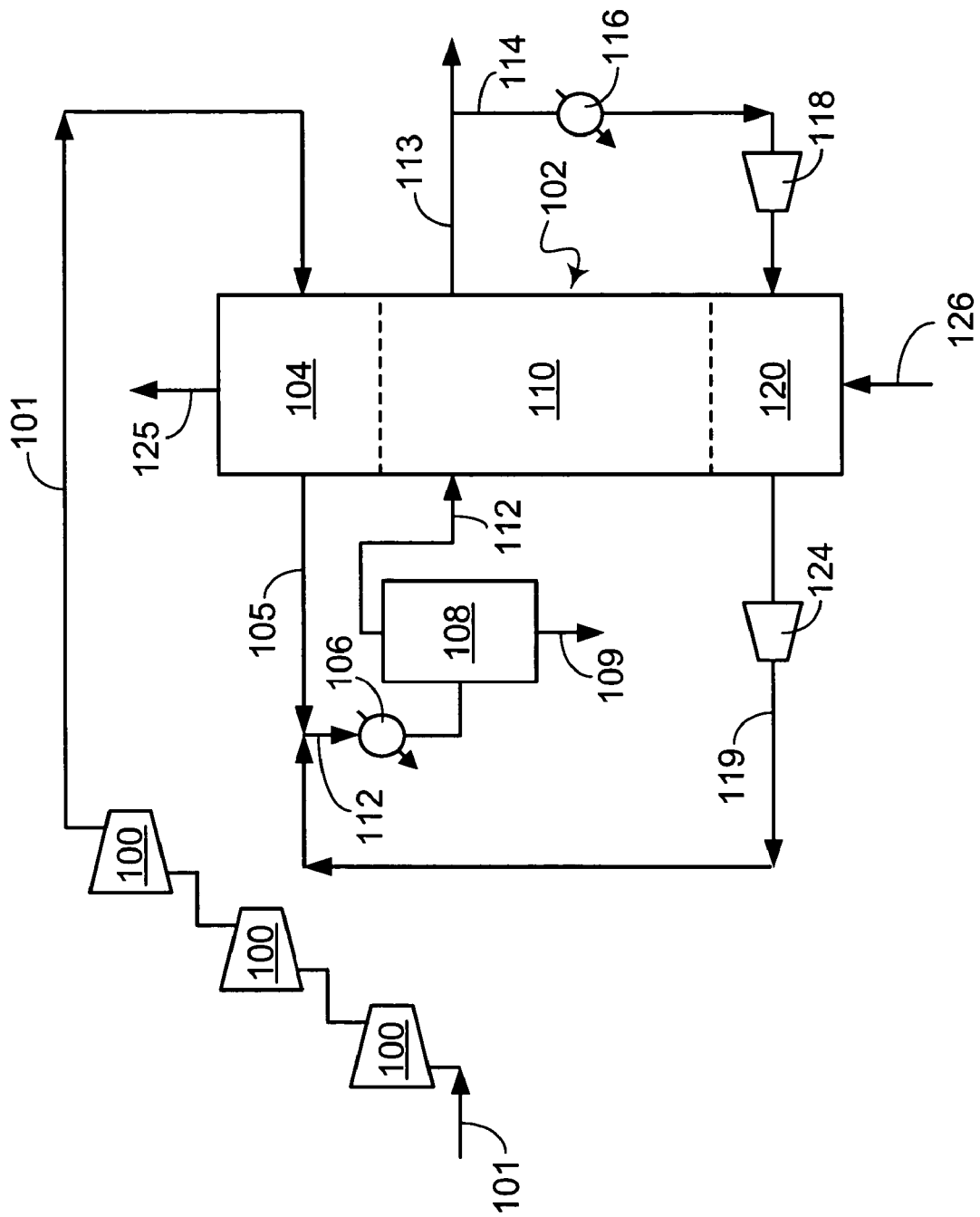
FIG. 5 shows a high pressure adsorbent wheel system with a boost blower to minimize power consumption.

FIG. 5 shows an embodiment of the present invention with counter-current cooling in which a boost blower is located at least at one location in the system to minimize the power consumption that would be involved in recompression of the gas streams. Shown in FIG. 5 are three compressors 100, from which comes a stream of compressed gas in line 101 to a regeneration sector 104 of an adsorbent wheel 102 shown rotating in a direction indicated by lines 125 and 126. The stream of compressed gas in line 101 which is optionally heated by a heat exchanger or other heating means, not shown, continues as a stream in line 105 to a heat exchanger 106 in which it is cooled and then to a condenser 108 in which condensable impurities are condensed from the gas stream and removed at line 109. The gas stream in line 112 now continues to the adsorption sector 110 of the adsorbent wheel 102 where the bulk of the remaining impurities are removed from the gas stream which after passing through the adsorption sector 110, becomes a purified product gas in line 113 which is used as needed. A portion of the purified gas product in line 113 is diverted through a line 114 and cooled at heat exchanger 116 by cooling means, such as cooling water. The pressure of the cooled purified gas product may be boosted by a boost blower 118 in order to maintain the pressure of the gas stream and to avoid the need of a gas stream to be combined to the gas stream prior to compression. The boost blower 118 may also be located as shown at boost blower 124 to increase the pressure of the stream in line 119. In some applications, it may be desirable to have a boost blower at 118 or 124 and it is possible in some applications that the boost blower would be at both locations. In either case, the pressure in line 119 needs to be increased to a level that is greater than the pressure in line 105. The cooled gas stream now continues to a cooling sector 120 of adsorbent wheel 102 to cool the surface of the adsorbent wheel 102. The gas stream can now be boosted in pressure by the boost blower 124 as previously stated and then is combined with the gas stream shown here being combined with the flow of gas in line 105 that has gone through the regeneration sector 104.

Figure 6:
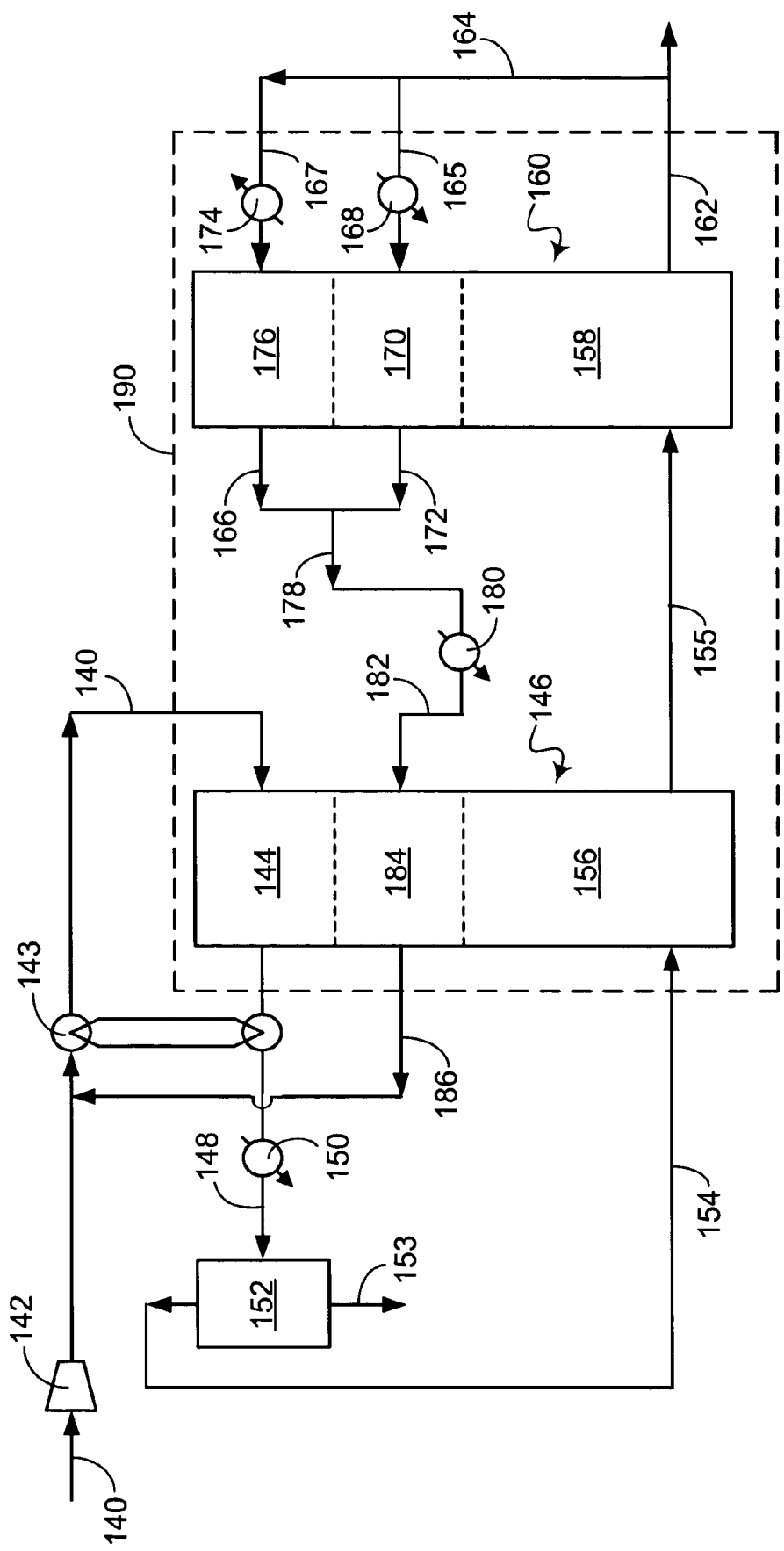
FIG. 6 shows a two adsorbent wheel system for producing very dry gas streams.

FIG. 6 shows a two-stage dryer having two adsorbent wheels. The adsorbent wheels are shown contained within a pressure vessel 190. This type of dryer is effective for producing extra dry gases, such as drying natural gas to LPG specifications or drying air to levels below 1 ppm water. In FIG. 6, a stream of air in line 140 is shown passing through a compressor 142. The resulting compressed stream which has been heated by the heat of compression goes to a regeneration sector 144 of an adsorbent wheel 146. Additional heat may be applied as shown at heat exchanger 143 to the stream prior to its contact of the regeneration sector 144 in order to improve the effectiveness of the regeneration step. In FIG. 6 is shown an optional heat exchange between the incoming regeneration stream and the outgoing regeneration stream. Impurities are removed from the regeneration sector 144 as the stream passes through that sector of the adsorbent wheel 146. Gas flow in line 148 is then cooled as shown by a heat exchanger 150, or other cooling means and then the gas flow is cooled further to a temperature sufficient to allow condensable impurities in the stream to condense and be removed at a condenser 152 in a waste stream at line 153. A cool, but saturated gas stream at line 154 then proceeds to an adsorption sector 156 of the adsorbent wheel 146 where impurities are removed from the gas stream and adsorbed onto the adsorbent wheel. The wheel will eventually turn so that those impurities will be subsequently removed in the regeneration sector 144. After leaving the adsorption sector 156, a gas stream in line 155 is cooled, if necessary, and proceeds to an adsorption sector 158 in a second adsorbent wheel 160 where the remainder of the remaining water is removed from the gas stream, along with other impurities according to the particular adsorbent used. The moisture level of a resulting product stream in line 162 is extremely low. A small portion of the product stream in line 162 is diverted through a line 164 and is divided into two parts at lines 167 and 165, respectively, to treat the regeneration and cooling sectors of the second adsorbent wheel 160. A cooling gas portion in line 166 of the product stream is cooled at a heat exchanger 168 and then cools a cooling sector 170 of the second adsorbent wheel 160. A regeneration gas portion in line 172 is heated at a heat exchanger 174 and then passes through a regeneration sector 176 of the adsorbent wheel 160 to remove impurities from the adsorbent wheel. The cooling gas portion in line 166 and the regeneration gas portion in line 172 are shown combining into a single gas flow in line 178 and passing through a boost blower 180 to increase the pressure of a resulting gas flow in line 182 which is then cooled to a sufficient temperature to cool a cooling sector 184 of the adsorbent wheel 146. A cooling sector gas flow in line 186 then is sent to be combined with the regeneration gas flow to the regeneration sector 144. A boost blower (not shown) will be needed to accomplish this.

In one embodiment of the invention as shown in the FIGURES, fresh air is compressed to about 100 psig in three stages of compression with intercooling between stages of compression. A large amount of water is removed from the first and second stage intercoolers. This air is compressed to its final pressure of about 690 kPa (100 psig) in the third stage, where the air temperature reaches about 149° C. (300° F.). This air is fed to a pressure vessel housing the adsorbent wheel dryer system. The air is further heated to 180° C. (356° F.) using auxiliary steam. This air is used to regenerate the wheel and passes through the regeneration sector of the wheel, typically about ⅓ of the wheel area. The air is sent to a very low pressure drop fin-tube type heat exchanger; ca. DP=5 cm (2 inches) of water column and cooled back down to 32° C. (90° F.). The water is removed as condensate in the process and the cool air is fed to the adsorption sector of the wheel and dried down to 27 ppm water. A small portion (less than 6%) of this dried air is used to cool the wheel and sent back to the third stage for recompression or otherwise returned to the air flow, such as into the cooled feed that is dried by the adsorption sector of the adsorbent wheel. The remaining major portion of the dried air is fed to the process as dry air net product.

The following example demonstrates the efficiency of the high pressure deep desiccant wheels of the present invention.

EXAMPLE 1

A wheel having an outer diameter of 103.6 cm (3.4 feet), a hub diameter of 11.43 cm (4.5 inches), and a face area of 0.8332 m$^2$ (8.969 ft$^2$) was used. The adsorbent wheel had an active media volume of 0.4166 m$^3$ (14.713 ft$^3$), a wheel void fraction of 0.73, a rotation rate of 10 revolutions per hour with 360 seconds per cycle, a zeolite fraction of 0.7, a wheel void fraction of 0.73, a paper density of 0.83 grams per cubic centimeter and a media mass of 93.3 kg (205.7 pounds) of paper. The following process conditions were used. The level of water in the feed was reduced from 7270 ppm to 27 ppm (v/v). The adsorption pressure was 7.80 ATM (abs).

TABLE 1

| Process Variables | Adsorption Phase | Regeneration Phase | Cooling Phase |
| --- | --- | --- | --- |
| Gas Velocity | 110.1 cm/sec | 184.4 cm/sec | 68.0 cm/sec |
| Gas Inlet Temp. | 34.4° C. | 180.0° C. | 34.4° C. |
| Feed Mole Fraction water | 7270 ppm(v/v) | 16875 ppm(v/v) | 27.2 ppm(v/v) |
| Feed Mole Fraction | 0.00727 mole/mole | 0.016875 mole/mole | 0.0000272 mole/mole |

TABLE 1-continued

| Process Variables | Adsorption Phase | Regeneration Phase | Cooling Phase |
|---|---|---|---|
| Adsorption Step Time | 180 seconds | 158.4 seconds | 21.6 seconds |
| Gas Rate | 7259 SCFM | 7259 SCFM | 538 SCFM |

The product gas rate was approximately 6721 SCFM and the water mole fraction in that gas was 27.2 parts per million expressed on a volumetric basis.

EXAMPLE 2

In this example, a comparison is made between the standard adsorbent beds used to remove impurities from natural gas with the use of an adsorbent wheel in accordance with the present invention. It can be seen that the present invention affords a significant reduction in the quantity of adsorbent required; both due to the continuous operation of an adsorbent wheel and the feasibility of operating with a single adsorbent wheel as compared to the multiple adsorbent beds needed in the present state of the art systems. In a typical three-bed system, over 72,000 kg (150,000 pounds) of adsorbent are required for the three beds, while in an adsorbent wheel system to process the same flow of natural gas, only about 1500 kg (3400 pounds) of adsorbent are needed.

Design Basis: $H_2O$ from NG/3-Bed Design—Comparative Example

|  | Feed | Regen | Cooling |
|---|---|---|---|
| Flow Rate/bed (lb mole/hr): | 21896 | 3302 | 3302 |
| Pressure (psia) | 1016 | 1016 | 1016 |
| Temperature (° F.) | 104 | 550 | 104 |
| Step Time (hours) | 12 | 2.5 | 1.5 |
| Composition (Mol-%): |  |  |  |
| $H_2O$ | 0.1054 | 0.00001 | 0.00001 |
| $CO_2$ | 1.51 | 1.51 | 1.51 |
| $C_2+$ | 16.0 | 16.0 | 16.0 |
| $C_1$ | 82.384 | 82.49 | 82.49 |
| Process Design: |  |  |  |
| Bed Diameter (ft) | 10.5 |  |  |
| Bed Height (ft) | 17.1 |  |  |
| Adsorbent Type | 4A |  |  |
| Adsorbent per Bed (lbs/bed) | 56,846 |  |  |

Design Basis: $H_2O$ from Natural Gas/1 Adsorbent Wheel Design

|  | Feed | Regen | Cooling |
|---|---|---|---|
| Flow Rate/bed (lb mole/hr): | 21896 | 3302 | 3302 |
| Pressure (psia) | 1016 | 1016 | 1016 |
| Temperature (° F.) | 104 | 550 | 104 |
| Step Time (minutes) | 1.5 | 0.75 | 0.75 |
| Composition (Mol-%): |  |  |  |
| $H_2O$ | 0.1054 | 0.00001 | 0.00001 |
| $CO_2$ | 1.51 | 1.51 | 1.51 |
| $C_2+$ | 16.0 | 16.0 | 16.0 |
| $C_1$ | 82.384 | 82.490 | 82.490 |
| Process Design: |  |  |  |
| Wheel Speed (RPH) | 20 |  |  |
| Wheel Diameter (ft) | 14 |  |  |
| Depth (ft) | 1.33 |  |  |
| Adsorbent Type | 4A |  |  |
| Adsorbent per Bed (lbs/bed) | 3445 |  |  |
| Adsorbent Density (lbs/ft³) | 17.0 |  |  |

EXAMPLE 3

In this example, a two-stage high pressure wheel system with no loss of air is shown. All impurities (water) are removed by condensation.

A dryer for gas that is at moderate to high pressure (ca. 7.8 Atmosphere absolute) consists of a pair of adsorbent wheels. Hot compressed gas exits the final stage of the compressor at a temperature of 150° C. The water content is 23,000 ppm(v) (parts water per million parts of wet air by volume) before entering the two-stage high pressure wheel system. The flow rate of wet air is 3.162 m³/second (6700 SCFM) [Standard Cubic Feet per Minute where standard conditions are taken as 101.4 kPa (14.7 psia) and 21° C. (70° F.)].

The hot compressed gas regenerates the 1st wheel. This hot wet air is directed through the regeneration portion of the first of two wheels. In passing through the regeneration sector of the first wheel, the wet air picks up still more water. The exit condition of this air is about 29,000 ppm(v) water. This air will have cooled by about 30° C. and exits the regeneration portion at about 120° C.

The next step is to cool the gas flow to condense impurities, which are removed by a phase separator, such as a condenser. The gas exiting the regeneration sector of the first wheel can be cooled in several stages. Above the dew point of the effluent gas, the heat is useful and can be passed to the regeneration sector of the second wheel.

All of the first regeneration effluent must be cooled to a temperature limited by the available cooling water supply. Condensed water exits out the bottom of the phase separator while the vapor phase water exits with the air out the overhead stream from the separator.

A stream consisting of the cooling gas effluent of the first wheel is mixed with either the regeneration effluent or the overhead stream or the knockout. If the cooling gas stream is above the saturation level of the overhead stream, then this stream is mixed with the regeneration effluent. If the cooling gas effluent of the first wheel is below the saturation level of the knockout overhead, then the gas is mixed with the knockout overhead. This cooling gas stream has a magnitude of X where X is determined by the regeneration and cooling streams required for the second wheel.

The flow goes to adsorption sector of 1st wheel countercurrent to regeneration. The magnitude of the gas stream going to the adsorber section of the first wheel is now 6700+X SCFM. This gas stream will be close to a saturated condition at or near to the cooling water temperature. In the simulations of this example we take the temperature as 33.3° C. and the water content as 6400 ppm by volume. A major fraction of is the water in the gas stream is removed by the adsorber and concentrated on the solid portion of the adsorbent wheel. The temperature of the gas rises by about 13° C.

as it transits the adsorption zone of the first wheel. The gas leaves the adsorber at about 180 ppm(v) at a temperature of 46° C.

Then the flow goes to adsorption sector of second wheel. The entire product stream from the first adsorption sector is fed to the adsorption zone of the second wheel. It will generally be advantageous to cool this gas to a temperature limited by the available cooling water. The gas stream is dried further to a level of about <1 ppm(v). The temperature rises very slightly. At this point in the drying process the gross product of the second wheel is split into two streams, each having a very dry condition. The majority is taken as a net product at a nominal flow rate equal to the compressor feed rate of 6700 SCFM.

The remainder, X SCFM, is then split into two other streams; one portion his heated for regeneration of the second wheel and the other is used as a cooling gas for the second wheel. Each of these gas streams is passed is a direction that is counter-current with respect to the second wheels adsorption direction.

Regeneration and cooling parts exiting the second wheel are combined, re-pressurized and cooled, and become counter-current cooling for the first wheel, and then reintroduced back into main flow either before the cooling to condense the water or into the feed to the 1st wheel adsorption zone.

For the purposes of this example the feed pressure has been taken as 7.8 atmospheres absolute. The compressor feed is held constant at 6700 SCFM and each regeneration stream is fixed at 150° C. Cooling streams are taken at 33.3° C. The magnitude X of the first wheel cooling stream has been varied from 1000 SCFM to 1500 SCFM. The rotation rate of the first wheel is maintained at 30 revolutions/hour. This condition was found to be near the optimum rate for each value of X.

The results of these simulations are given below in Table 2.

TABLE 2

| X, SCFM | Yf (ppm(v)) | Yp1 (ppm(v)) | Yc1 (ppm(v)) | Yr1 (ppm(v)) | Water Removal (lbmole/hr) |
|---|---|---|---|---|---|
| 1000 | 6678 | 180 | 1382 | 29118 | 0.214 |
| 1250 | 6434 | 177 | 1129 | 29032 | 0.218 |
| 1500 | 6220 | 194 | 1063 | 29421 | 0.247 |

A saturated stream exiting the knockout overhead at 33.3 C will have 6400 ppm(v) of water. Therefore at the value of X=1500 SCFM the best place to mix in the first wheel's cooling stream effluent was at the exit of the knockout. At X=1250 SCFM there is little difference while at X=1000 SCFM the best place to put the cooling effluent stream is before the cooling and water knockout step.

The details of the downstream wheel are omitted as it is relatively easy to design a wheel for the low water level being fed to the second wheel.

Although illustrative embodiments of the present invention have been described herein, it is to be understood that the invention is not limited to those precise embodiments, but that various changes and modifications can be effected therein by those skilled in the art without departing from the scope or spirit of this invention.

What is claimed is:

1. A process of producing a purified compressed gas comprising:
    a) providing a gas feed;
    b) providing at least one rotary adsorber having a multiplicity of passages through which a compressed gas can flow for adsorbing impurities therefrom, the rotary adsorber capable of adsorption of impurities from said compressed gases and of regeneration on a continuous basis as the wheel rotates;
    c) after said gas feed has been compressed to produce a compressed gas feed, sending said compressed gas feed through a regeneration sector of said rotary adsorber wherein said compressed gas feed removes impurities from said regeneration sector of said rotary adsorber and produces a contaminated stream of compressed gas containing said impurities;
    d) then cooling said contaminated stream of compressed gas and condensing condensable impurities from said contaminated stream of compressed gas within a condensing means removing a quantity of condensed impurities from said condensing means and thereby producing a cooled stream of compressed gas; and
    e) then passing said cooled stream of compressed gas to an adsorption sector of said rotary adsorber wherein a further quantity of impurities are removed from said compressed gas to produce a purified compressed gas product;
wherein a minor portion of said cooled purified compressed gas product, having been cooled to a desired temperature, is sent to a cooling sector of said rotary adsorber to cool said cooling sector.

2. The process of claim 1 wherein after said minor portion of cooled compressed purified gas cools said cooling sector, said minor portion of cooled compressed purified gas is combined with said compressed gas feed.

3. The process of claim 2 wherein said minor portion of cooled compressed purified gas is returned to said compressed gas feed after compression of said gas feed and before said compressed gas feed passes through said regeneration sector of said rotary adsorber.

4. The process of claim 1 wherein said minor portion of cooled compressed purified gas is returned to said gas feed before compression of said gas feed.

5. The process of claim 2 wherein said minor portion of cooled compressed purified gas is boosted in pressure by a pressure boosting means and then returned to said gas feed after said gas feed is compressed.

6. The process of claim 1 wherein said minor portion is returned to said gas feed prior to said gas feed passing to said compressor.

7. The process of claim 1 wherein said minor portion of said purified compressed gas product travels co-current to said compressed gas feed in said rotary adsorber.

8. The process of claim 1 wherein said minor portion comprises about 3 to 15% by volume of said purified compressed gas product.

9. A process of producing dry compressed air comprising:
    a) first sending a stream of air to at least one air compressor to produce a stream of heated, compressed air;
    b) then passing said heated compressed air through a regeneration sector of a rotary adsorber to remove water from said regeneration sector of said rotary adsorber and thereby producing a cooled wet stream of compressed air;
    c) then passing said cooled wet stream of compressed gas through a heat exchanger to produce a cooler stream of compressed gas and to condense and remove a portion of water from said cooled wet stream;

d) after said portion of water is removed, passing said cooler stream of compressed air to an adsorption sector of said rotary adsorber wherein a further quantity of water is removed from said cooler stream of compressed air to produce a dried compressed air product stream and wherein said adsorption sector adsorbs water from said cooler stream of compressed air;

e) passing said purified compressed gas product through a second heat exchanger to cool said purified compressed gas product to a desired temperature; and f) removing from said cooled purified compressed gas product a minor portion of cooled purified compressed gas, wherein said minor portion is sent to a cooling sector of said rotary adsorber to cool said cooling sector.

10. A process of producing purified compressed gases in a two rotary contactor system wherein said two rotary contactor system comprises a first rotary adsorber and a second rotary adsorber, each of said first and second rotary adsorbers comprising a regeneration sector, an adsorption sector and a cooling sector, said process comprising:

a) providing a flow of compressed gas feed;

b) providing a first rotary adsorber and a second rotary adsorber, wherein each of said rotary adsorbers comprises a regeneration sector, an adsorption sector and a cooling sector;

c) first sending said compressed gas feed through said regeneration sector of said first rotary adsorber to remove impurities from said regeneration sector of said first rotary adsorber and producing a contaminated stream of compressed gas containing said impurities;

d) then cooling said contaminated stream of compressed gas and condensing a portion of impurities from said contaminated stream of compressed gas, removing a quantity of said condensed impurities and thereby producing a cooled stream of compressed gas;

e) then passing said cooled stream of compressed gas to an adsorption sector of said first rotary adsorber wherein a further quantity of contaminants are removed from said compressed gas to produce a purified compressed gas product;

f) then passing said purified compressed gas product to an adsorption sector of said second rotary adsorber wherein said adsorption sector removes a majority of remaining condensable impurities and producing a final product gas stream; and g) diverting a minor portion of said final product gas streams into at least two recycle gas streams;

wherein one of said recycle gas streams is heated and then sent through a regeneration sector of said second rotary adsorber and a second of said recycle gas streams is cooled and is sent through a cooling sector of said second rotary adsorber, and then the two recycle streams are reintroduced into the gas stream either prior to sending the compressed gas feed to the regeneration zone of the first rotary adsorber, or prior to sending the cooled stream of compressed gas to the adsorption sector of the first rotary adsorber, or at both points.

11. The process of claim 10 wherein the two recycle streams are combined prior to being reintroduced into the gas stream.

12. The process of claim 10 wherein the combined recycle stream passes through the cooling sector of the first rotary adsorber.

13. The process of claim 10 wherein after exiting the cooling sector of the first rotary adsorber, the combined recycle stream is boosted in pressure, and combined with the compressed gas feed prior to said stream being sent to the regeneration zone of the first rotary adsorber.

14. The process of claim 10 wherein alter exiting the cooling sector of the first rotary adsorber, the combined recycle stream is boosted in pressure, and combined with the cooled stream of compressed gas prior to said stream being sent to the adsorption zone of the first rotary adsorber.

15. The process of claim 10 wherein the regeneration stream for said second rotary adsorber travels in a direction counter-current to the direction of flow in said second rotary adsorber adsorption sector.

16. The process of claim 10 wherein the second rotary adsorber cooling stream travels in a direction counter-current to the direction of the flow in the second rotary adsorption sector.

17. The process of claim 10 wherein the second rotary regeneration effluent stream is combined with the second rotary cooling sector effluent stream prior to boosting the pressure.

18. The process of claim 17 wherein the combined stream passes through the cooling sector of the first rotary adsorber, and is combined with the main process flow upstream of the regeneration sector of the first rotary adsorber.

19. The process of claim 17 wherein the combined stream flows through the first rotary adsorber cooling sector in a direction counter-current to the flow through the first rotary adsorber adsorption sector.

20. The process of claim 17 wherein said combined recycle streams are sent through a pressure booster and then pass through the cooling sector of said first rotary adsorber.

21. The process of claim 10 wherein said there is a sharing of heat between said contaminated flow and said compressed gas feed.

22. A two-stage dryer for producing a low moisture gas stream comprising:

a) at least two rotary contactors, each rotary contactor having a multiplicity of passages, through which compressed gas can flow, for adsorbing impurities therefrom, the rotary contactors being capable of adsorption of impurities from said compressed gases and of regeneration on a continuous basis as the wheel rotates and each of said rotary contactors comprising at least one adsorbent, regeneration and cooling sector;

b) means to provide a compressed flow of a moisture containing gas to said regeneration sector of a first of said two rotary contactors;

c) means to send said compressed flow of a moisture containing gas from said regeneration sector to a condensing means wherein condensed impurities are removed to produce a dried flow of gas;

d) means to send said dried flow of gas through an adsorption zone of said first rotary contactor;

e) means to send said dried flow of gas from said adsorption zone of said first rotary contactor through an adsorption zone of said second rotary contactor to produce a very dry gas product stream;

f) means to send a majority portion of said very dry gas stream to be used as product; and g) means to send two minority portions of said very dry gas stream, a first of said minority portions to be first heated to a desired temperature and then to be sent to a regeneration zone of said second rotary contactor and a second of said minority portions to be cooled to a desired temperature and then to be sent to a cooling zone of said rotary contactor.

23. The two-stage dryer of claim 22 wherein said first of said minority portions passes through a pressure boosting means after passing through said regeneration sector and then is returned to said moisture containing gas.

24. The two-stage dryer of claim 22 wherein said second of said minority portions passes through a pressure boosting means after passing through said cooling sector and ten is returned to said moisture containing gas.

* * * * *